(12) United States Patent
Qadir

(10) Patent No.: US 12,549,167 B2
(45) Date of Patent: Feb. 10, 2026

(54) SAMPLING SIGNALS

(71) Applicant: Nordic Semiconductor ASA, Trondheim (NO)

(72) Inventor: Omer Qadir, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 81 days.

(21) Appl. No.: 18/570,902

(22) PCT Filed: Jun. 27, 2022

(86) PCT No.: PCT/EP2022/067515
§ 371 (c)(1),
(2) Date: Dec. 15, 2023

(87) PCT Pub. No.: WO2023/274928
PCT Pub. Date: Jan. 5, 2023

(65) Prior Publication Data
US 2024/0313748 A1    Sep. 19, 2024

(30) Foreign Application Priority Data

Jun. 29, 2021 (GB) ..................... 2109381

(51) Int. Cl.
H03K 5/1252 (2006.01)
G11C 7/10 (2006.01)
H03K 3/037 (2006.01)

(52) U.S. Cl.
CPC ......... H03K 5/1252 (2013.01); G11C 7/1087 (2013.01); H03K 3/0375 (2013.01)

(58) Field of Classification Search
CPC ... H03K 3/0375; H03K 5/1252; G11C 7/1087
See application file for complete search history.

(56) References Cited

U.S. PATENT DOCUMENTS 3,764,920 A    10/1973    Galcik et al.
5,387,825 A    2/1995    Cantrell et al.
(Continued)

FOREIGN PATENT DOCUMENTS

EP    1 321 946 A2    6/2003
TW    200735532    3/1995

OTHER PUBLICATIONS

International Search Report and Written Opinion for PCT/EP2022/067515, dated Oct. 20, 2022, 19 pages.
(Continued)

Primary Examiner — Patrick O Neill
(74) Attorney, Agent, or Firm — Klarquist Sparkman, LLP

(57) ABSTRACT

An asynchronous circuit portion for sampling an input signal is provided. The asynchronous circuit portion comprises a sampling circuit portion arranged to receive the input signal and to generate first and second sample signals; a first storage element arranged to generate a first storage signal on a first storage output on reception of the first sample signal; and a second storage element arranged to generate a second storage signal on a second storage output on reception of the second sample signal. A control circuit portion is arranged to detect if either of said first and second storage signals has been generated, to fix the first and second storage outputs and to generate a sample ready signal. The circuit portion generates an output signal corresponding to the input signal using the first storage output when the sample ready signal is generated.

19 Claims, 6 Drawing Sheets

(56) References Cited

U.S. PATENT DOCUMENTS

| | | | |
|---|---|---|---|
| 5,748,034 A | | 5/1998 | Ketineni et al. |
| 5,968,180 A | * | 10/1999 | Baco .................. G06F 5/16 |
| | | | 713/400 |
| 2011/0001533 A1 | | 1/2011 | Lee et al. |
| 2013/0003805 A1 | | 1/2013 | Zeng et al. |
| 2018/0054187 A1 | | 2/2018 | Sadowski |
| 2021/0099179 A1 | | 4/2021 | Chen |
| 2022/0004864 A1 | * | 1/2022 | Dally .................. G06N 3/04 |

OTHER PUBLICATIONS

IPO Combined Search and Examination Report under Sections 17 and 18(3) for Great Britain Application No. 2109381.0, dated Nov. 22, 2021, 8 pages.

Workcraft, "Analog-to-asynchronous elements," The Wayback Machine—https://web.archive.org/web/20210615093325/https://workcraft.org/a2a/start. 201 2014-2021 workcraft.org, 7 pages.

\* cited by examiner

12,549,167 B2

SAMPLING SIGNALS

CROSS REFERENCE TO RELATED APPLICATIONS

This is the U.S. National Stage of International Application No. PCT/EP2022/067515, filed Jun. 27, 2022, which was published in English under PCT Article 21(2), which in turn claims the benefit of Great Britain Application No. 2109381.0, filed Jun. 29, 2021.

The present invention relates to sampling signals, e.g. as part of asynchronous logic.

Asynchronous logic (i.e. logic that does not operate according to a repeating clock signal) can be used to improve the speed of digital devices, as data storage can happen as fast as the logic allows, without being limited by the speed of a clock signal. Furthermore, because the logic does not require a clock signal to be generated or balanced its power consumption and area may be reduced.

However, because their operation is not coordinated by a common clock signal, circuits utilising asynchronous logic may be more susceptible to glitches causing errors such as metastability and race conditions. One source of glitches may be external inputs to a circuit (e.g. transient changes in an input signal that do not correspond to intended input data). It is therefore advantageous to be able to generate a sanitized glitch-free (or at least glitch-reduced) signal from a glitchy input signal.

Previous approaches for handling glitchy input data to asynchronous circuits rely on complex circuit designs that can take a relatively long time to produce a sanitized sample, and which produce two separate output signals when sampling a single input signal. For instance, FIG. 1 shows a circuit 200 illustrative of a prior art approach for sampling a potentially glitchy input signal sig. The circuit 200 comprises two sampling elements 202, 204 arranged to detect the state of the input signal, with the first sampling element 202 outputting a logic high signal when the input signal goes low, and the second sampling element 204 outputting a logic high signal when the input signal goes high. The outputs of these sampling elements 202, 204 feed into additional logic including a mutual exclusion element 206 and several Muller-C elements 208, which are arranged to produce a first stable output 210 that is logic high when the sampled signal is logic low and a second stable output 212 that is logic high when the sampled signal is logic high. The circuit 200 thus produces stable outputs from a potentially glitchy input signal. However, as the circuit 200 produces two separate outputs, it requires additional arbitration circuitry to convert these back into a single stable output signal for use by downstream circuitry. Also, and the generation of the outputs may involve complex logic elements and several time consuming logical loops that may slow down sampling times. An improved approach may be desired.

According to a first aspect of the present invention there is provided an asynchronous circuit portion for sampling an input signal comprising:

a sampling circuit portion arranged to receive the input signal and generate a first sample signal if the input signal has a first state, and to generate a second sample signal if the input signal has a second state;
a first storage element arranged to receive the first sample signal and comprising a first storage output, wherein the first storage element is arranged to generate a first storage signal on the first storage output on reception of the first sample signal;
a second storage element arranged to receive the second sample signal and comprising a second storage output, wherein the second storage element is arranged to generate a second storage signal on the second storage output on reception of the second sample signal;
a control circuit portion arranged to detect if either of said first and second storage signals has been generated and, if either of the first or second storage signals has been generated, to fix the first and second storage outputs and to generate a sample ready signal; and
wherein the circuit portion generates an output signal corresponding to the input signal using the first storage output when the sample ready signal is generated.

Thus, it will be seen by those skilled in the art that the circuit portion in accordance with the present invention provides a less complex solution for sampling a potentially glitchy input signal. Because the first and second storage outputs are fixed (e.g. latched) as soon as either of the first or second storage signals is detected, the circuit portion effectively prevents subsequent changes or glitches in the input signal (which could cause errors in downstream circuitry) propagating through to the output signal. The use of simple storage elements (e.g. latches or flip-flops) to achieve this reduces the complexity of the circuit portion, e.g. allowing for faster sampling times. For instance, the first and/or second storage element may comprise a latch such as a D-type latch, or another type of storage element such as a flip-flop.

Furthermore, generating a sample ready signal allows the output signal to be provided inherently as a single sanitized output signal, rather than as two separate outputs as in prior art approaches, because the sample ready signal serves as an indicator of when the single output signal is ready for use. This may enable easier integration with other circuitry and/or avoid the need for further circuitry that may add additional delays to sampling times.

Because the circuit portion generates the output signal using the first storage output (e.g. only the first storage output, even when the first storage signal is not generated because the input signal has the second state), the complexity of the circuit portion may be reduced. For instance, ordinarily the presence of the first storage signal indicates that the input signal has the first state, and the absence of the first storage signal on the first storage output when the sample ready signal is generated indicates that the second storage signal has been generated (to trigger the sample ready signal) and that the input signal thus has the second state. The circuit portion can thus deduce a correct output signal using only the first storage output.

Using only the first storage output to generate the output signal may reduce the risk of the output signal becoming metastable. For instance, if somehow the first and second storage signals were both output for the same sample (e.g. due to a transition in the input signal occurring very soon after the moment of sampling), the circuit portion does not attempt to arbitrate between the two and simply continues to uses the first storage output to produce the output signal. The applicant has recognised that providing a clean and stable output signal that does not match the input signal at the moment of sampling may be preferable to the risk of metastability in the output signal. In such cases (e.g. a transition very close to the sampling time) both output states may effectively be valid anyway.

The input signal may comprise a digital signal that can assume only two different states. The two states may be defined by predetermined voltage values or ranges.

In some embodiments the input signal may be considered to have the first state when it has a voltage below a predetermined threshold and the second state when it has a voltage above the predetermined threshold (or vice-versa).

In a set of embodiments, the first state comprises a logic low (e.g. a lower voltage), and the second state comprises a logic high (e.g. a higher voltage). Of course, in other embodiments the first state comprises a logic high, and the second state comprises a logic low. Similarly, the first and second sample signals, the first and second storage signals and the sample ready signal may each comprise logic high or logic low signals, e.g. chosen as convenient for a particular implementation of the circuit portion. The output signal may simply have a state that matches the state of the sampled input signal. The output signal may comprise a version of the sampled input signal (e.g. an inverted and/or amplified version).

In some embodiments, the circuit portion is arranged to sample the input signal on reception of a start signal. The start signal may be provided from a separate circuit portion. The control circuit portion may be arranged to enable the sampling circuit portion in response to receiving the start signal. The control circuit portion may be arranged to reset (e.g. un-latch, or clear) the first and second storage outputs in response to receiving the start signal (e.g. after they have been fixed as part of a previous sampling process).

The start signal may comprise the first phase of a four phase handshake, followed by the generation of the sample ready signal as the second phase, de-assertion of the start signal as the third phase and the de-assertion of the sample ready signal as the final phase. In other words, the control circuit portion may be arranged to de-assert the sample ready signal on detection of the de-assertion of the start signal, to complete a four phase handshake with the separate circuit portion.

In some embodiments, the sampling circuit portion is arranged to generate the first sample signal if the input signal has a first state for a minimum duration (e.g. defined by internal component delays in the sampling circuit portion), and/or to generate the second sample signal if the input signal has a second state for a minimum duration (which could be the same as the minimum duration in respect of the first state but this is not essential). Requiring the input signal to maintain the first or second state before a sample signal is generated may prevent the circuit portion from inadvertently sampling the input signal during a transient glitch.

The sampling circuit portion may comprise a first sampling element arranged to receive the input signal and generate the first sample signal and/or a second sampling element arranged to receive the input signal and generate the second sample signal. In some such embodiments, the first and/or second sampling element may comprise a mutual exclusion element (MUTEX) arranged to receive the input signal or an inverted version thereof as a first request input, an enable signal as a second request input, and to output the first or second sample signal as a second grant output.

The control circuit portion may be arranged to detect if either of the first and second storage signals has been generated by monitoring both of the first and second storage outputs separately, or alternatively by monitoring a combination of the first and second storage outputs. For instance, in some embodiments the control circuit portion comprises a stored signal input (e.g. a latched signal input where the first and/or second storage elements are latches) connected to the first and second storage outputs via an OR gate, such that the stored signal input receives a signal when either of the first or second storage signals is generated.

The circuit portion may be configured to simply provide the first storage output, or a version thereof (e.g. an inverted version thereof) as the output signal. However, it may in some embodiments be beneficial to maintain the output signal to be independent to subsequent changes in the first storage output. In other words, the circuit portion may be arranged to produce an output signal comprising a persistent sample of the input signal. In some embodiments, the circuit portion comprises an output storage element arranged to receive the first storage output, and output the first storage output as the output signal when the sample ready signal is generated. The output storage element may comprise a latch such as a D-type latch, or another type of storage element such as a flip-flop.

The control circuit portion may be arranged to fix the output of the output storage element on reception of a or the start signal, i.e. to hold a previous output signal until the next sample is ready. In such embodiments, the control circuit is arranged to reset (e.g. un-latch) the output storage element when the sample ready signal is produced, to cause a new sample output signal (i.e. the first storage output) to be output. Ensuring that each sample taken persists until the next sample is ready may reduce errors in downstream circuitry by avoiding changes in the output signal before the sample ready signal is produced. In embodiments where the first and/or second storage elements comprise flip-flops, an output storage element may not be required to ensure that a previous output signal is held until the next sample is taken.

The general approach of sampling and storing a potentially glitchy input signal in response to a start signal, and generating a sample ready signal once the input signal has been sampled, is independently inventive. Thus according to a second aspect of the present invention there is provided a method of asynchronously sampling an input signal, the method comprising:

receiving a start signal;
detecting a state of the input signal;
when the state of the input signal has been detected, storing the detected state in a storage element;
when the detected state has been stored in the storage element, generating a sample ready signal.

It will be seen by those skilled in the art that storing the detected state in a storage element when the state of the input signal has been detected (i.e. only once the signal has been sampled) may allow the input signal to be accurately sampled even when there is variation in processing speed due to process, voltage and/or temperature variations, component aging or any other parameters affecting processing speed.

The start signals and sample ready signals may be received from and sent to an external circuit to which the stored state is provided. The method may comprise a four-phase handshake, comprising subsequent de-assertions of the start signal and the sample ready signal. This may allow the external circuit portion to receive accurate samples of the input signal regardless of variations in process, voltage, temperature or aging or any other parameters affecting speed of the circuit.

Features of any aspect or embodiment described herein may, wherever appropriate, be applied to any other aspect or embodiment described herein. Where reference is made to different embodiments, it should be understood that these are not necessarily distinct but may overlap.

One or more non-limiting examples will now be described, by way of example only, and with reference to the accompanying figures in which.

Figure 2:
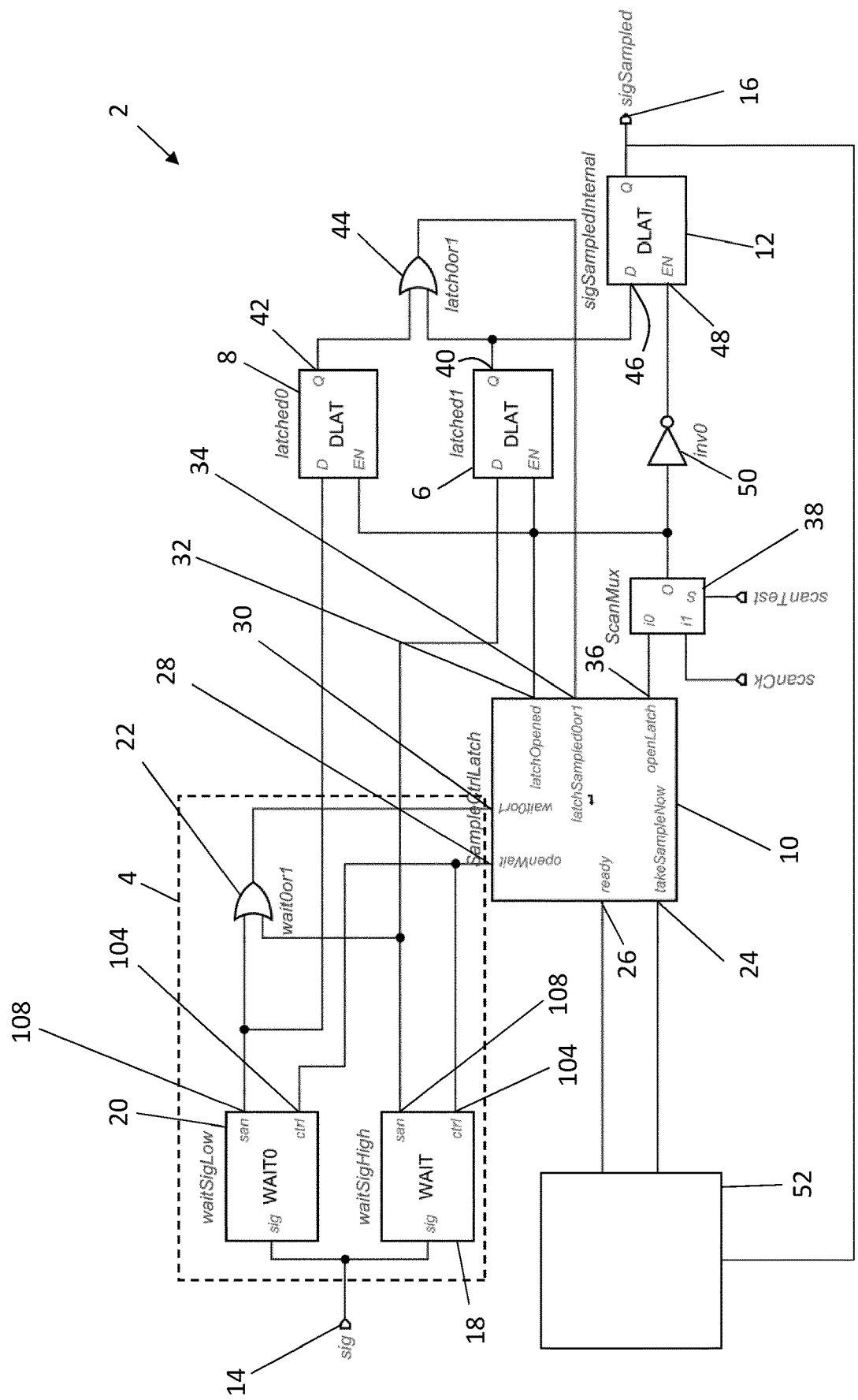
FIG. 2 is a schematic diagram of a circuit portion according to an embodiment of the invention.

FIG. 2 shows a circuit portion 2 comprising a sampling circuit portion 4, a first latch 6, a second latch 8, a control circuit portion 10 and an output circuit portion 12.

As explained below, the circuit portion 2 is configured to sample a potentially glitchy digital signal received at input 14 to produce a glitch-free and persistent output signal at output 16.

The sampling circuit portion 4 comprises a first sampling element 18 and a second sampling element 20. The first and second sampling elements 18, 20 are shown in more detail in FIGS. 3 and 4. A timing diagram 500 illustrating exemplary operation of the first and second sampling elements 18, 20 is shown in FIG. 5.

Figure 4:
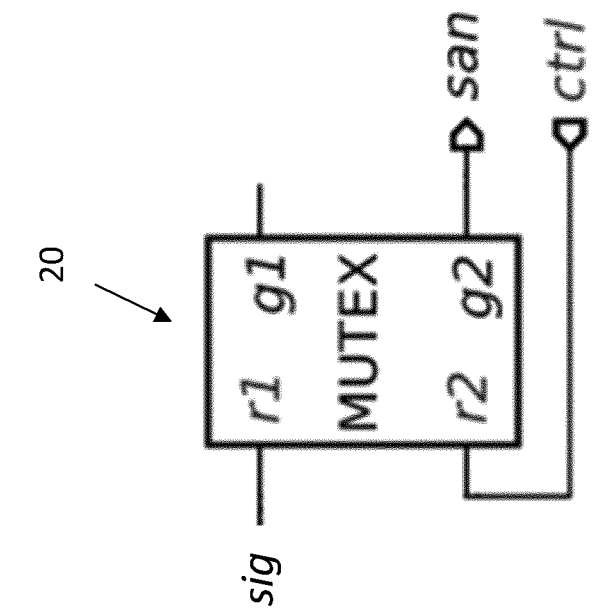
FIGS. 3 and 4 are schematic diagrams of the sampling elements shown in FIG. 2.
Figure 3:
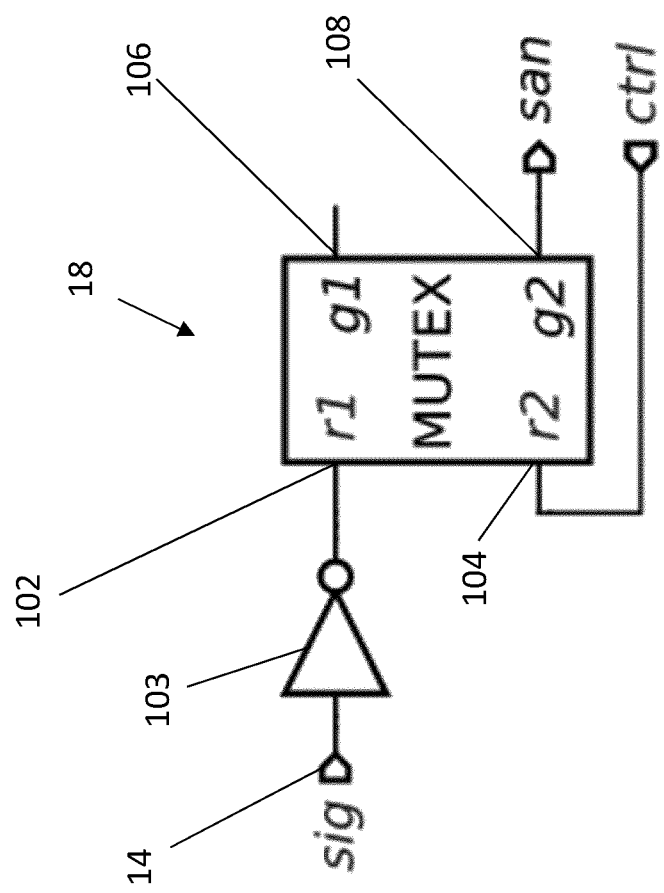

Referring now to FIGS. 3 and 4, each of the first and second sampling elements 18, 20 comprises a mutual exclusive logic element (MUTEX) 100 comprising first and second request inputs 102, 104 and first and second grant outputs 106, 108. The MUTEX 100 is arranged such that if the first request input 102 goes low whilst the second request input 104 is high, the second grant output 108 goes high. Otherwise, the second grant output 108 is low. The MUTEX 100 also includes a metastability filter which ensures that the two grant outputs 108 and 106 never enter a metastable state, e.g. if the first request input 102 and the second request input 104 change very close to each other.

For the first sampling element 18, the input signal 14 is connected to the first request input 102 via an inverter 103, an enable signal is connected to the second request input 104, and an output is connected to the second grant output 108. As such, when the enable signal is high, the output will go high if the input signal 14 goes high for a minimum duration tied to internal delays in the MUTEX 100. The second sampling element 20 has the same structure as the first sampling element 18, but without an inverter on the first request input 102. As such, if the enable signal is high, the output of the second sampling element 20 will go high if the input signal goes low for the minimum duration.

Figure 5:
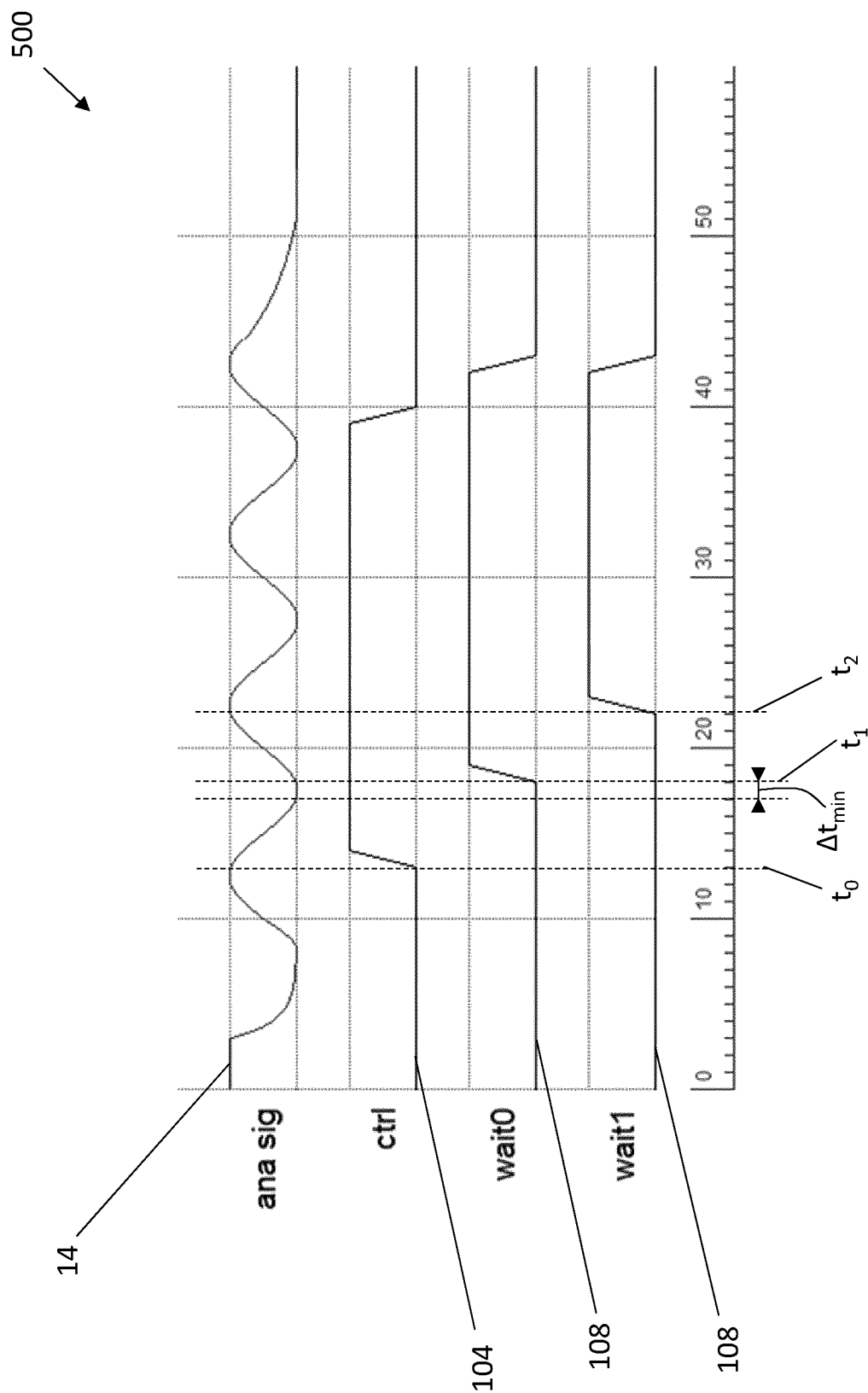
FIG. 5 is a timing diagram illustrating operation of the sampling elements.

For instance, as illustrated in FIG. 5, at an initial time to, the second request input 104 of both sampling elements 18, 20 is brought high. The voltage of the input signal 14 is changing between a first lower state and a second higher state, but at a time $t_1$, the signal 14 has been low for the minimum duration $\Delta t_{min}$, and the second grant output 108 of the second sampling element 20 thus goes high and persists there. The second request input 104 remains high, and at a later time $t_2$ the input signal 14 has been high for the minimum duration and the second grant output 108 of the first sampling element 18 thus goes high and persists there.

Returning to FIG. 2, the first and second sampling elements 18, 20 receive the potentially glitchy digital signal from the input 14 as their respective inputs. As explained above, when enabled, the first sampling element 18 outputs a first digital high sample signal when its input is high for a minimum duration. Contrastingly, when enabled, the second sampling element 20 outputs a second digital high sample signal when its input is low for a minimum duration. This reduces the likelihood that the input signal is inadvertently sampled during a glitch (i.e. during a transient change in the input signal from its intended state), because the first or second sample signal is only produced when the input signal has maintained a steady digital state for a minimum duration. At other times, the first and second sampling elements 18, 20 output a digital low signal. Furthermore, even if the first or second sample signal is triggered by only a short pulse on the signal input 14, the output 16 of the circuit portion 2 is stable and persistent.

The first and second latches 6, 8 are D-type latches. The output of the first sampling element 18 is connected to the data input of the first latch 6, and the output of the second sampling element 20 is connected to the data input of the second latch 8. When the first and second latches 6, 8 receive a digital high enable signal they output a signal with a state that matches their data input. When the first and second latches 6, 8 receive a digital low enable signal (i.e. a disable signal), they simply maintain the last output state regardless of the state of the data input (i.e. they latch to the last output state).

Figure 6:
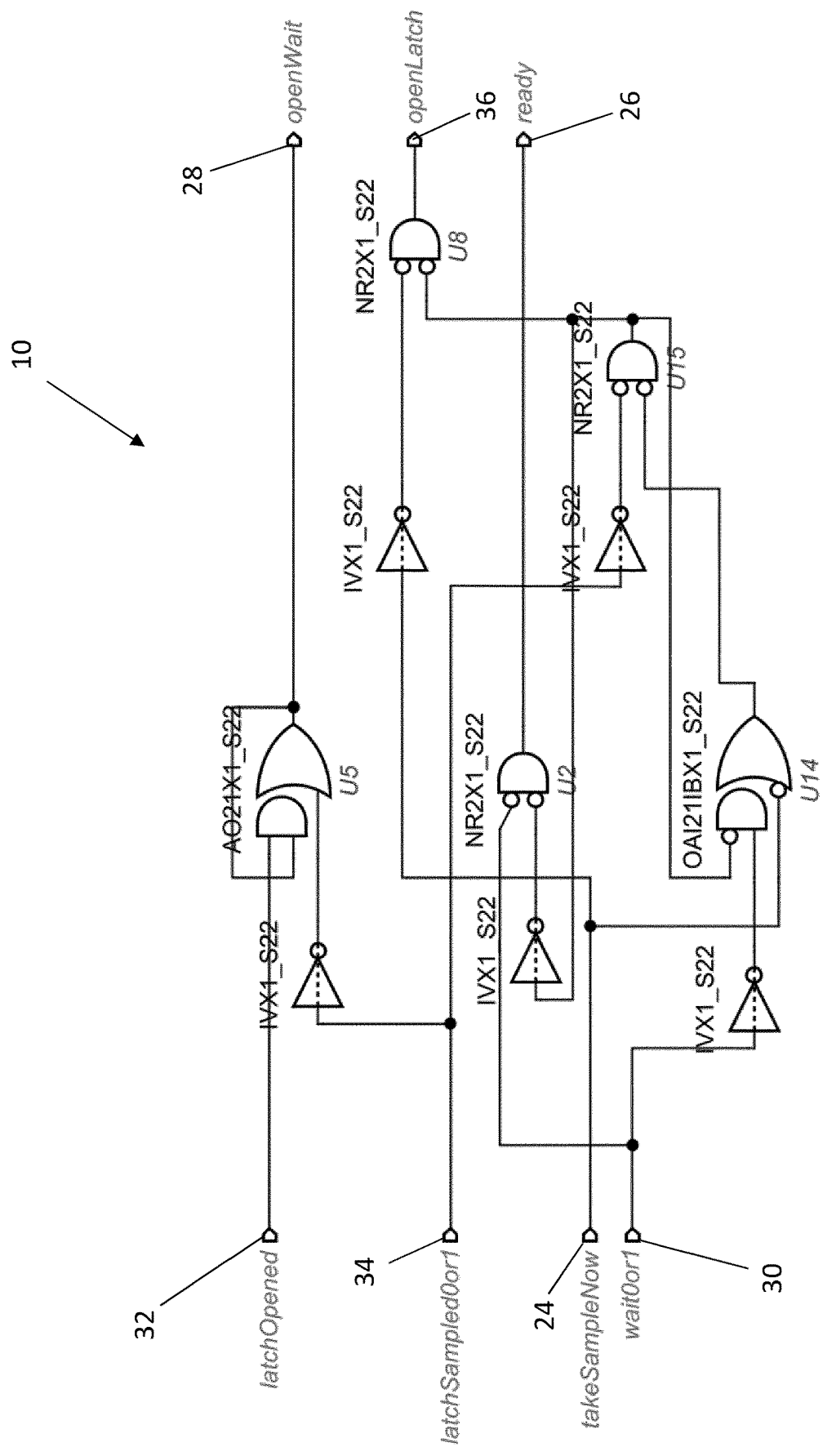
FIG. 6 is a schematic diagram of the control circuit portion shown in FIG. 2.

The control circuit portion 10 is shown in more detail in FIG. 6. The circuit control portion 10 comprises a start signal input 24, a sample ready signal output 26, a sample control signal output 28, a sample signal input 30, a latch enabled input 32, a latched signal input 34 and a latch enable output 36.

Enable inputs 104 of the first and second sampling elements 18, 20 are connected to the sample control signal output 28. The outputs 108 of the first and second sampling elements 18, 20 are connected to the sample signal input 30 of the control circuit portion 10 via an OR gate 22. Enable inputs 104 of the first and second latches 6, 8 are connected directly to the latch enabled input 32, and to the latch enable output 36 via a scan test multiplexer 38. The outputs 40, 42 of the first and second latches 6, 8 are connected to the latched signal input 34 via an OR gate 44.

The output circuit portion 12 comprises another D-type latch with its data input 46 connected to the output of the first latch 6 and its enable input 48 connected to the latch enable output 36 via the scan test multiplexer 38 and an inverter 50. The scan test multiplexer 38 is provided for testing purposes. In normal operation the scan test multiplexer 38 is arranged simply to connect the latch enable output 36 to the enable inputs of the first and second latches 6, 8, the latch enabled input 32 and the output circuit portion 12 (via the inverter).

Figure 7:
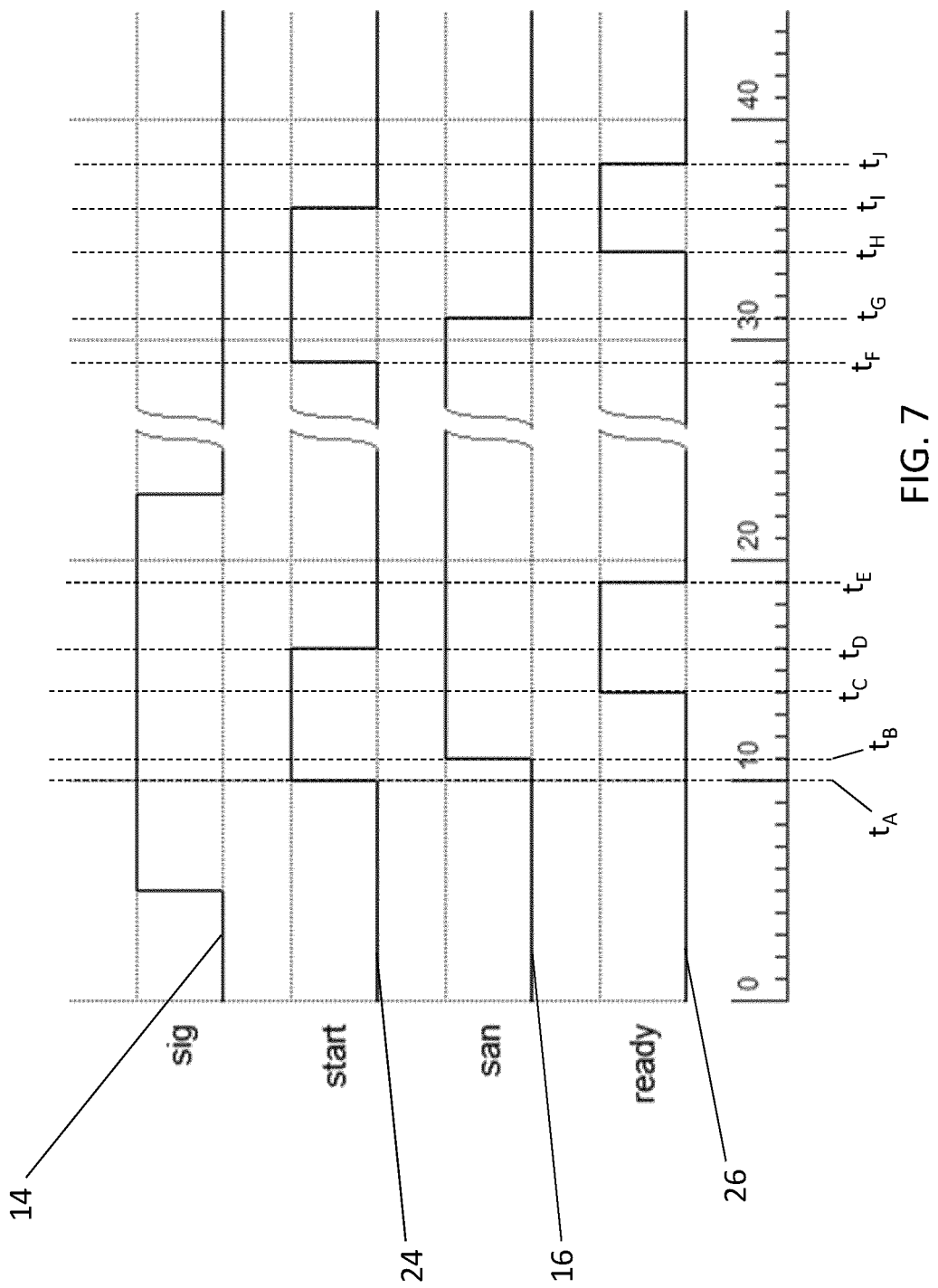
FIG. 7 is a timing diagram illustrating the operation of the circuit portion of FIG. 2.

The operation of the circuit portion 2 will now be described with reference to FIGS. 2-4 and 6 along with a timing diagram 700 shown in FIG. 7. It is emphasised that the timing diagram 500 shown in FIG. 5 is simply intended to illustrate an example operation of the sampling elements 18 and 20 and does not correspond to the timing diagram 700 of FIG. 7.

In use, a logic high start signal 24 is received at a first time ta (e.g. from another circuit portion 52) by the start signal input 24, instructing the circuit portion 2 to sample the input signal at input 14. This causes the latch enable output 36 to go high. The high signal from the latch enable output 36 is thus sent to the first and second latches 6, 8 and to the output circuit portion 12 via the inverter. This disables the output circuit portion 12 and enables the first and second latches 6, 8. This, in turn, causes a digital high signal to be received by the latch enabled input 32, and consequently a digital high signal to be output by the sample control signal output 28. This enables the first and second sampling elements 18, 20. In other words, when a logic high is received on the start signal input 24, it causes the control circuit portion 10 to enable the first and second latches 6, 8 via the latch enable output 36 thereby also freezing the output latch 12. At this point, the latched signal input 34 is low, which indicates that the latches 6 and 8 are clear of old values and are prepared to receive new samples from the sampling elements 18, 20.

In one scenario, the input signal 14 has a logic high state when the sample start signal 24 is received at time ta. In such a scenario, after the minimum duration the first sampling element 18 outputs the first sampling signal (i.e. a logic high). This causes the data input and output of the first latch 6 to go high (as the latches 6, 8 are enabled by latch enable output 36). A logic high is thus also received by the sample signal input 30 and the latched signal input 34 of the control circuit portion 10.

On receiving a logic high on the sample signal input 30 and the latched signal input 34, the control circuit portion 10 outputs a logic low on the latch enable output 36. This latches the first and second latches 6, 8 (i.e. fixing their output). The logic low on the latch enable output 36 also enables the output circuit portion 12, which thus outputs a logic high as a sanitized output signal (as the output from the first latch 6 is high). The latch enabled input 32 thus goes low, indicating to the control circuit portion 10 that the latches 6 and 8 have been disabled. The control circuit portion 10 then outputs a logic low on the sample control signal output 28, which disables the first and second sampling elements 18, 20, preparing them for the next round of sampling in the future.

Because the first and second sampling elements 18, 20 are now disabled, the sample signal input 30 goes low. Because the latched signal input 34 is still high, the control circuit portion 10 thus outputs a logic high from the sample ready signal output 26 at time $t_C$, indicating that the sanitized output from the output circuit portion 12 is ready for use. The requester 52, on receipt of the sample ready signal, processes the sanitized output as necessary and also lowers the start signal at time $t_D$, which causes the control circuit portion 10 to lower the sample ready signal at time $t_E$, completing a four-phase sampling handshake between the circuit portion 2 and the requester.

At a later time $t_F$, another digital high start signal is received by start signal input 24, triggering another sample of the input signal. At this later time to the state of the input signal 14 is low. As before, the start signal received at the start signal input 24 disables the output circuit portion 12 (i.e. latches its output to the previous state, digital high) and enables the first and second latches 6, 8. Because the new start signal latches the output circuit portion 12 the previous output persists until the next sample is produced. This may avoid errors in downstream circuitry.

As before, the new start signal causes the latch enable output 36 to go high, disables the output circuit portion 12 and enables the first and second latches 6, 8. A digital high signal is received by the latch enabled input 32, and a digital high signal is output by the sample control signal output 28, enabling the first and second sampling elements 18, 20.

Because the input signal is now low, the second sampling element 20 outputs the second sampling signal (i.e. a logic high). This causes the data input and output of the second latch 8 to go high, and a logic high to be received by the sample signal input 30 and the latched signal input 34 of the control circuit portion 10.

The control circuit portion 10 thus outputs a logic low on the sample control signal output 28 and the latch enable output 36. This disables the first and second sampling elements 18, 20 and latches the first and second latches 6, 8 (i.e. fixing their output). The logic low on the latch enable output 36 enables the output circuit portion 12, which thus outputs a logic low output signal (because the first latch output is low) at time $t_G$.

The output circuit portion 12 is only connected to the first latch output (which is not affected by the input signal going low), but the configuration of the first and second latches 6, 8 means that in ordinary operation the state of the first latch output will be opposite to that of the second latch output when the latch enable output 36 goes low after a sample has been taken. Thus the output circuit portion 12 can reliably output a single output signal with a state matching that of the input signal based on only the first latch output. This configuration means that the output circuit 12 itself never needs to arbitrate between two different latch signals, reducing the chances of race conditions in the output signal which might arise from merging a 2-bit value into a single bit.

The first and second sampling elements 18, 20 are now disabled again and the sample signal input 30 goes low. The latched signal input 34 is still high, so the control circuit portion 10 outputs another logic high sample ready signal from the sample ready signal output 26 at time $t_H$, indicating that the sanitized output from the output circuit portion 12 is ready for use. As before, the requester (e.g. another circuit portion), on receipt of the sample ready signal, processes the sanitized output as necessary and lowers the start signal at time $t_I$, which causes the control circuit portion 10 to lower the sample ready signal at time $t_J$ completing another four-phase sampling handshake between the circuit portion 2 and the requester.

Thus the circuit portion 2 produces a stable and persistent output signal from a glitchy signal without requiring complex logic elements or additional circuitry to produce a single output signal. This enables faster sampling speeds.

Figure 1:
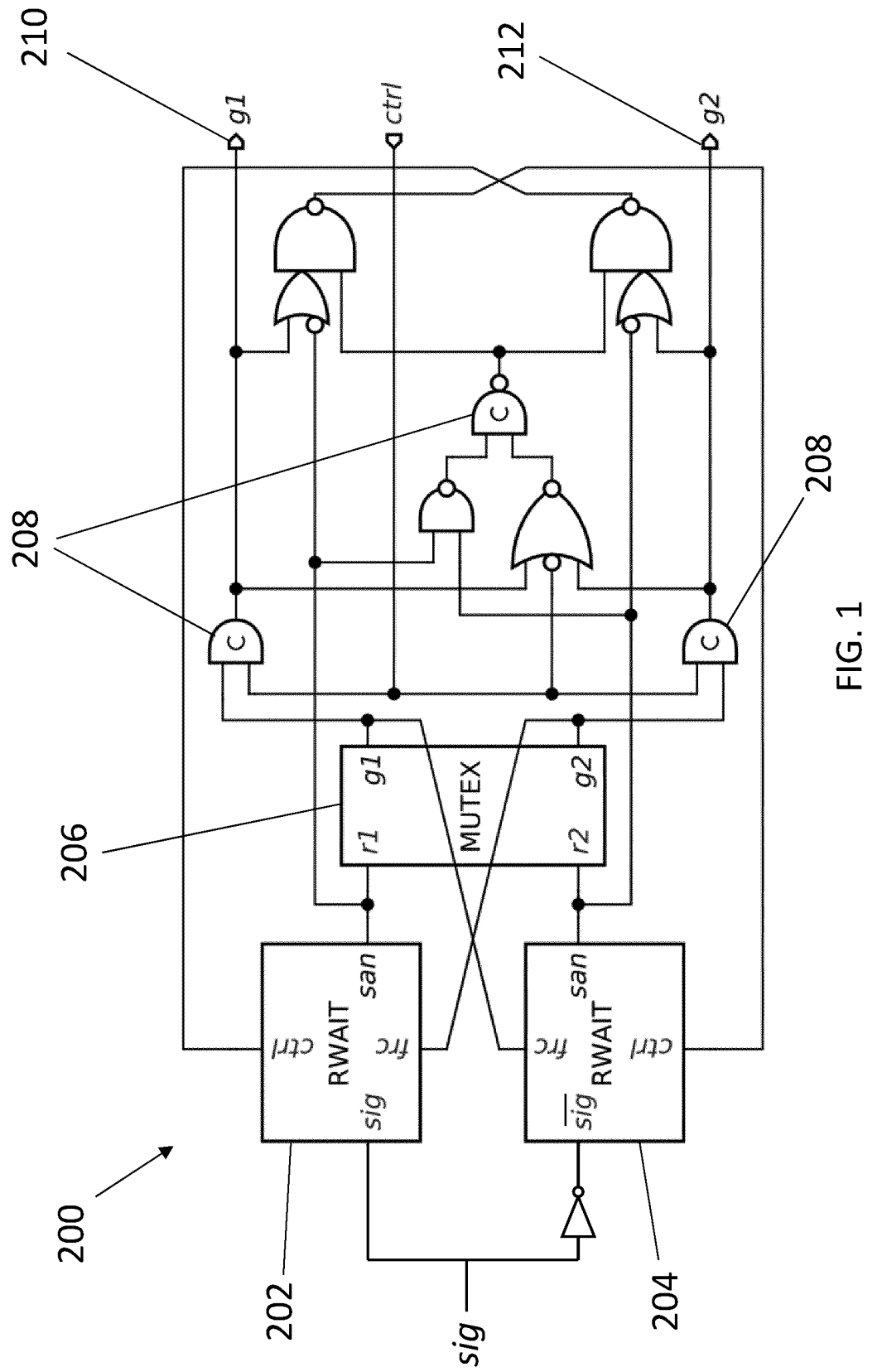
FIG. 1 is a schematic diagram of a circuit portion according to the prior art.

For instance, Table 1 illustrates the simulated difference in operational speed between the circuit 200 shown in FIG. 1 (with some additional circuitry to combine the two outputs into a single output signal and to produce a sample ready signal) and the example of the present invention described above with reference to FIGS. 2-7. Table 1 shows the sampling speed for scenarios in which the input signal changes its state between samples and in which the input signal has the same state. Table 1 shows the time between receiving the start signal and issuing a sample ready signal for all scenarios, and the time between receiving the start signal and the correct output signal being generated ("sigSampled") for scenarios in which the output signal changes (because the input signal has changed). It will be seen that the approach described herein achieves notably faster sampling times in all scenarios.

TABLE 1

| scenario | FIG. 1 (prior art) | FIGS. 2-5 |
| --- | --- | --- |
| transition 0 --> 1 | | |
| start --> ready | 6.029 ns | 3.016 ns |
| start --> sigSampled | 3.425 ns | 2.457 ns |
| transition 1-->0 | | |
| start --> ready | 5.664 ns | 3.082 ns |
| start --> sigSampled | 3.046 ns | 2.401 ns |
| transition 1-->1 | | |
| start --> ready | 6.029 ns | 2.908 ns |
| transition 0-->0 | | |
| start --> ready | 5.664 ns | 3.19 ns |

While the invention has been described in detail in connection with only a limited number of embodiments, it should be readily understood that the invention is not limited

The invention claimed is:

1. An asynchronous circuit portion for sampling an input signal comprising:
   a sampling circuit portion arranged to receive the input signal and generate a first sample signal if the input signal has a first state, and to generate a second sample signal if the input signal has a second state;
   a first storage element arranged to receive the first sample signal and comprising a first storage output, wherein the first storage element is arranged to generate a first storage signal on the first storage output on reception of the first sample signal;
   a second storage element arranged to receive the second sample signal and comprising a second storage element output, wherein the second storage element is arranged to generate a second storage signal on the second storage output on reception of the second sample signal; and
   a control circuit portion arranged to detect if either of said first and second storage signals has been generated and, if either of the first or second storage signals has been generated, to fix the first and second storage outputs and to generate a sample ready signal; and
   wherein the asynchronous circuit portion generates an output signal corresponding to the input signal using the first storage output and the sample ready signal indicates that the output signal is ready for use.

2. The asynchronous circuit portion as claimed in claim 1, arranged to sample the input signal on reception of a start signal.

3. The asynchronous circuit portion as claimed in claim 2, wherein the control circuit portion is arranged to enable the sampling circuit portion in response to receiving the start signal.

4. The asynchronous circuit portion as claimed in claim 2, wherein the control circuit portion is arranged to reset the first and second storage outputs in response to receiving the start signal.

5. The asynchronous circuit portion as claimed in claim 2, wherein the control circuit portion is arranged to de-assert the sample ready signal on detection of a de-assertion of the start signal.

6. The asynchronous circuit portion as claimed in claim 1, wherein the sampling circuit portion is arranged to generate the first sample signal if the input signal has a first state for a minimum duration.

7. The asynchronous circuit portion as claimed in claim 1, wherein the sampling circuit portion comprises a first sampling element arranged to receive the input signal and generate the first sample signal.

8. The asynchronous circuit portion as claimed in claim 7, wherein the first sampling element comprises a mutual exclusion element arranged to receive the input signal or an inverted version thereof as a first request input, an enable signal as a second request input, and to output the first sample signal as an output.

9. The asynchronous circuit portion as claimed in claim 1, wherein the control circuit portion is arranged to detect if either of the first and second storage signals has been generated by monitoring a combination of the first and second storage outputs.

10. The asynchronous circuit portion as claimed in claim 9, wherein the control circuit portion comprises a stored signal input connected to the first and second storage outputs via an OR gate, such that the stored signal input receives a signal when either of the first or second storage signals is generated.

11. The asynchronous circuit portion as claimed in claim 1, configured to provide the first storage output or a version thereof as the output signal.

12. The asynchronous circuit portion as claimed in claim 1, wherein the output signal comprises a persistent sample of the input signal.

13. The asynchronous circuit portion as claimed in claim 12, comprising an output storage element arranged to receive the first latch output, and output the first storage output as the output signal, wherein the sample ready signal indicates that the output signal is ready for use.

14. The asynchronous circuit portion as claimed in claim 13, wherein the control circuit portion is arranged to fix the output of the output storage element on reception of a start signal.

15. The asynchronous circuit portion as claimed in claim 1, wherein the first storage element comprises a latch or a flip-flop.

16. The asynchronous circuit portion as claimed in claim 1, wherein the sampling circuit portion is arranged to generate the second sample signal if the input signal has a second state for a minimum duration.

17. The asynchronous circuit portion as claimed in claim 1, wherein the sampling circuit portion comprises a second sampling element arranged to receive the input signal and generate the second sample signal.

18. The asynchronous circuit portion as claimed in claim 17, wherein the second sampling element comprises a mutual exclusion element arranged to receive the input signal or an inverted version thereof as a first request input, an enable signal as a second request input, and to output the second sample signal as an output.

19. The asynchronous circuit portion as claimed in claim 1, wherein the second storage element comprises a latch or a flip-flop.

* * * * *